United States Patent Office 3,705,879
Patented Dec. 12, 1972

---

3,705,879
URETHANE COATING COMPOSITIONS
Bernardas Brizgys, Southgate, Mich., assignor to BASF Wyandotte Corporation, Wyandotte, Mich.
No Drawing. Filed Dec. 4, 1970, Ser. No. 95,395
Int. Cl. C08g 22/36
U.S. Cl. 260—77.5 AC    5 Claims

---

ABSTRACT OF THE DISCLOSURE

A single package, moisture-curable, stabilized, urethane coating composition containing unreacted isocyanate groups and capable of curing to a hard surface film at ambient temperature in about two to eight hours comprises an isocyanate-terminated prepolymer prepared by reacting (1) an organic polyol with (2) a stoichiometric excess of an organic polyisocyanate in the presence of an inert solvent and optionally in the presence of a tetravalent metallo organic salt catalyst. The resulting prepolymer is then admixed with a boron trifluoride compound, a selected amine and a tetravalent metallo-organic salt. Optionally, the boron trifluoride compound may be added to either (a) the organic polyol, (b) the organic polyisocyanate prior to the preparation of the isocyanate-terminated prepolymer, or (c) to the reaction mixture during the preparation.

---

Single package, moisture-curable, stabilized, urethane coating compositions are known to have previously been prepared. Such compositions can advantageously be utilized if they have good shelf stability and are capable of curing to a hard film at ambient temperatures within a period of several hours. Single package coating compositions having the described properties are much preferred to two-package coating systems since they may be stored for about one year and used directly from the package to provide coatings having excellent protective physical characteristics. The two-package systems which comprise a prepolymer in one package and a catalyst and a prepolymer reactive compound in the other package are stable during storage for relatively lengthy periods but one they are combined have relatively short pot-life so that they must be used quickly if suitable coatings are to be obtained. Also, additional time and inconvenience result from the required mixing prior to use as compared to direct application of the single package compositions. The need for single package moisture-curable stabilized coating compositions capable of curing rapidly to form coatings having excellent physical properties is thus apparent.

Accordingly, it is an object of this invention to provide single package moisture-curable isocyanate-terminated coating compositions having excellent shelf-stability. A further object of this invention is to provide a single package moisture-curable isocyanate-terminated coating composition capable when cast of curing to a hard film in about two to eight hours at ambient temperature. Another object of this invention is to provide single package moisture-curable stabilized isocyanate-terminated coating compositions which, when cast and cured, yield coating compositions having good physical properties. These and other objects of the invention will become apparent from the following specification and examples.

The foregoing objects are accomplished by reacting an organic polyol with a stoichiometric excess of an organic polyisocyanate in the presence of an inert solvent and, optionally, in the presence of a metallo-organic salt catalyst and admixing with the reaction product a heterocyclic tertiary amine, a boron trifluoride compound and a tetravalent metallo-organic salt. The boron trifluoride compound may, optionally, be added to either the polyol or polyisocyanate prior to reaction or to the reaction mixture during reaction.

Any suitable tetravalent metallo-organic salt, such as, dibutyltin dilaurate, dibutyltin bis(lauryl) mercaptide, dibutyltin bis(isooctyl) thioglycolate, dibutyltin mercaptopropionate, butyltin trichloride, tributyltin o-phenylphenate, tributyltin cyanate, stannous octoate, stannous oleate, dibutyltin di(2-ethyletherate), and dibutyltin-bis-acetylacetonate or mixtures thereof may be used. Preferably, dibutyltin dilaurate is employed as the tetravalent metallo-organic salt. The salt is preferably employed in an amount ranging from about 0.01 to about 0.2 percent by weight based on the solids content of the prepolymer. This salt can also be used as a catalyst in the prepolymer formation.

Since boron trifluoride is a gas at room temperature, it is desirable to add the boron trifluoride in the form of a compound or complex which is liquid at room temperature. Accordingly, the term "boron trifluoride compound" as used herein, includes boron trifluoride and compounds and complexes of boron trifluoride which facilitates the use of boron trifluoride. Ether compounds and complexes of boron trifluoride are preferred. These materials are disclosed and discussed in Boron Trifluoride and Its Derivatives by Harold Simons Booth and Donald Ray Martin, pp. 68–71, John Wiley and Sons, Inc., New York, 1949. In general, compounds and complexes of the lower ethers are preferred since these provide higher percentages of $BF_3$ in the compound or complex. Particularly preferred are the boron trifluoride compounds or complexes of dimethyl ether, diethyl ether, methylethyl ether, and tetrahydrofuran. A suitable product, which is readily available, is the well-known commercial product known as boron trifluoride etherate which is primarily the boron trifluoride complex of diethyl ether. Generally, from about 0.02 weight percent to about 0.2 weight percent, preferably from 0.01 to 0.2 weight percent, based on the solids content of the isocyanate-containing composition, of the boron trifluoride compound will be employed.

Any suitable heterocyclic tertiary amines, such as triethylene diamine, and the like may be used. Piperazine, trimethyl piperazine or 4,4'-methylene bis(2-chloroaniline) may also be used. The preferred amines are trimethylpiperazine and triethylene diamine. Generally, from about 0.02 to 1.0% by weight of tertiary amine, based on the solids content of the prepolymer is employed. Preferably from about 0.05 to 0.5% by weight of amine, based on the solids content of the prepolymer is employed.

As mentioned, the compositions which are stabilized in accordance with the present invention are generally prepolymers prepared by the reaction of an organic polyol with an organic polyisocyanate. The reactants are employed in amounts such that an excess of isocyanate groups are present in the prepolymer. Stated otherwise, the NCO/OH ratio of the reactants is greater than one. Usually, a prepolymer is prepared having from about 1% to 10% and preferably from about 1% to 8% unreacted isocyanate and these are the prepolymers to which the present invention is particularly directed.

Organic polyisocyanate which may be employed in the preparation of the isocyanate-terminated prepolymers include aromatic, aliphatic, and cycloaliphatic polyisocyanates and combinations thereof. Representative of these types are the diisocyanates such as m-phenylene diisocyanate, toluene-2,4-diisocyanate, hexamethylene-1,6-diisocyanate, naphthylene - 1,5 - diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3' - dimethyl-4,4'-biphenyl diisocyanate, and 3,3'-dimethyldiphenylmethane-4,4'-diisocyanate; the triisocyanates such as 4,4',4''-triphenylmethane diisocyanate, polymethylene polyphenylisocyanate, and toluene 2,4,6-triisocyanate; and the tetraisocyanates such as 4,4'-dimethyldiphenylmethane-2,2'-5,5'-tetraisocyanate. Especially useful due to their availability and properties are toluene diisocyanate, diphenylmethane-4,4'-diisocyanate, and the polymethylene polyphenylisocyanate.

Illustrative of the organic polyols which may be employed in the preparation of the isocyanate-terminated prepolymers are those polyols containing at least two active hydrogen atoms. The term "active hydrogen atoms" refers to hydrogen atoms which, because of their position in the molecule, display activity according to the Zerewitinoff test as described by Kohler in J. of Am. Chem. Soc., 49, 3181 (1927).

The active hydrogen atoms are usually attached to oxygen, nitrogen, or sulphur atoms. Thus, suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-containing polyesters, polyalkylene ether polyols, hydroxy-terminated polyurethane polymers, polyhydric polythioethers, alkylene oxide adducts of acids and phosphorus, polyacetals, aliphatic polyols, aliphatic thiols including alkane, alkene and alkyne thiols having two or more —SH groups; diamines including both aromatic, aliphatic, and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2(4,4'-hydroxyphenol)propane, commonly known as bisphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerol, pentaerythritol, propylene glycol, 2,2-(4,4'-hydroxyphenyl)propane, and sucrose.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-secondary diamino naphthalene, and 2,4-secondary diamino toluylene; aliphatic polyamines such as N,N'-secondary ethylene diamine, N,N'-secondary 1,3-propylene diamine, N,N'-secondary 1,4-butylene diamine, and N,N'-secondary-1,3-butylene diamine.

Other compounds which do not necessarily fit within any of the previously set forth classes of compounds which are quite suitable in the production of NCO-terminated polyurethane compounds include the hydroxy-terminated polyurethane polymer such as a hydroxy-terminated polymer made by reacting an isocyanate with several moles of an alkylene glycol.

As mentioned, the prepolymers are prepared, generally in an inert atmosphere such as a nitrogen atmosphere, by reacting a stoichiometric excess of isocyanate with the polyol, optionally, in the presence of a catalyst, which may be the tetravalent metallo-organic salt or any other suitable catalyst, and at a temperature ranging from about 45° to 90° C. and for a period of about 1 to 5 hours. If catalyst is employed, these temperatures will be on the lower side of the range, usually from about 45° C. to 65° C. Preferably, this reaction is conducted in the presence of an inert solvent, such as, toluene, xylene, benzene, heptane, methylene chloride, ethyl acetate, methylethyl ketone, and the like. The inert solvent is employed to maintain suitable working viscosities of the resulting prepolymer. Generally, the resulting composition of inert solvent and prepolymer contains about 30 to 70% by weight of solids and preferably about a 40 to 60% solids content is desirable. After the prepolymer is prepared there is then admixed therewith the boron trifluoride compound, the heterocyclic amine and the tetravalent metallo-organic salt in the amounts specified.

The polyurethane coating compositions of the invention may be applied to various surfaces by any conventional means such as brushing, spraying, dipping, and passing a heated object through the powdered coating compositions for coating with a doctor blade. The compositions have found particular utility as coatings for leather and floors. In addition, various elastomeric coatings may be prepared from the compositions. Curing of the compositions may occur at room temperature, or, if desired, heat may be applied. The amount of time needed to cure the compositions will vary, depending upon the particular composition, the curing agent, if any, and the amount of moisture and heat which is in contact with the composition.

In addition to coatings, the stabilized compositions of the present invention may be employed in the preparation of numerous other polyurethane reaction products including sealants, elastomers, and foams. Well-known procedures and ingredients may be employed in the preparation of these polyurethane reaction products.

The following examples serve to illustrate the invention. All parts are by weight unless otherwise indicated.

The physical properties included in the examples were obtained by the following standard procedures.

In the examples all the properties of the resulting compounds were determined in accordance with the following standard test procedures:

| Test— | Method |
|---|---|
| Tensile strength, p.s.i. | ASTM D882–67 |
| Yield strength, p.s.i. | ASTM D882–67 |
| 100% modulus, p.s.i. | ASTM D882–67 |
| Elongation, percent | ASTM D882–67 |
| Elongation at yield, percent | ASTM D882–67 |
| Hardness, Sward | ASTM D2134–66 |
| Split tear strength, p.s.i. | ASTM D1938–67 |

EXAMPLE I

This example illustrates the preparation of a coating composition of the present invention wherein no catalyst is used in prepolymer formation and wherein the boron trifluoride compound is added during prepolymer formation.

To a suitable reaction vessel equipped with a thermometer, stirrer and heating vessel and blanketed with a nitrogen atmosphere there was added the following:

| Ingredient— | Amount |
|---|---|
| Polyol 1[1] | moles__ 1.5 |
| Polyol 2[2] | do___ 2.5 |
| Boron trifluoride etherate, percent on solids | 0.01 |
| Xylene, as solvent | percent__ 50 |

[1] Polyol 1—a propylene oxide adduct of pentaerythritol having an average molecular weight of about 400.
[2] Polyol 2—a polyoxypropylene glycol having an average molecular weight of about 700.

To this was then added 8.8 moles of toluene diisocyanate whereupon an exothermic reaction commenced and the temperature in the vessel rose to about 90° C. After the reaction was complete, the resulting prepolymer, which had a free-NCO content of 6.4 percent and a 50% solids content, was cooled to room temperature and then admixed with 0.2% weight percent content of trimethylpiperazine and 0.02 weight percent based on the solids content of dibutyltin bis(isooctyl) thioglycolate.

The above procedure was then repeated, but without the addition of the dibutyltin bis(isooctyl) thioglycolate or the trimethylpiperazine to the resulting prepolymer. Two more samples were then prepared wherein one sample had added thereto only the dibutyltin bis(isooctyl) thioglycolate and the other had only trimethylpiperazine added thereto. Then a sample of each of the polymers was tested for tensile strength, hardness, etc. in accordance with methods above-defined. The results of these tests are set forth below in Table I, wherein composition IA is the urethane of the present invention, composition IB is the comparative urethane, composition IC is the urethane containing the tetravalent metallo-organic salt and composition ID is the urethane containing the heterocyclic tertiary amine.

TABLE I

| Physical properties | Composition | | | |
|---|---|---|---|---|
| | IA | IB | IC | ID |
| Tensile strength, p.s.i. | 3,780 | 3,750 | 3,270 | 3,800 |
| Yield tensile, p.s.i. | 3,650 | 3,700 | 3,600 | 3,700 |
| 100% modulus, p.s.i. | 3,000 | 3,080 | 3,050 | 3,000 |
| Elongation, percent | 165 | 163 | 119 | 162 |
| Elongation at yield, percent | 7 | 7 | 7 | 6 |
| Hardness, Sward, 6 days | 34 | 36 | 38 | 32 |
| Split tear strength, p.s.i. | 10 | 15 | 12.5 | 10.0 |
| Taber abrasion W/Cs 17 wheel, with 1,000 gms., mg. lost/1,000 cycles | 28.9 | 30.4 | 27.5 | 27.4 |
| Set to touch time, hrs. | 2 | 9 | 4 | 3.5 |
| Dust free time, hrs. | 3 | 13 | 8 | 7.5 |
| Hard dry time, hrs. | 5.75 | 22 | 14 | 13 |
| Gel time at 50° C., days | 52 | 188 | 100 | 90 |

It can be seen from the above that the addition of the tetravalent metallo-organic salt catalyst and the heterocyclic tertiary amine, together, greatly improved the cure times without inhibiting storage stability or the physical properties of the urethane.

EXAMPLE II

This example which utilizes the procedure of Example I, illustrates the preparation of a series of urethane compositions wherein the presence of the boron trifluoride compound, the heterocyclic amine and the tetravalent metallo-organic salt are varied and the resultant effects on the physical properties.

In this series of compositions, four urethane prepolymers were prepared in the presence of a catalyst by mixing together in a nitrogen atmosphere the following ingredients:

| Ingredient— | Amount |
|---|---|
| Polyol 3[1] | moles__ 3 |
| Polyol 2 | do___ 2 |
| Toluene diisocyanate | do___ 8.4 |
| Hydrogenated toluene diisocyanate | do___ 2.0 |
| Stannous octoate, percent in solids, as catalyst | 0.01 |

[1] Polyol 3—a propylene oxide adduct of trimethylolpropane having an average molecular weight of about 400.

The resulting prepolymers were then cooled to about 37° C. and admixed with xylene to provide a 50% solution thereof or a composition having 50% solids content. The prepolymers identified as composition IIA, IIB, IIC and IID, respectively, then had added thereto varying amounts of the above-identified ingredients, as set forth in Table II, below.

TABLE II

| Ingredient | Composition | | | |
|---|---|---|---|---|
| | IIA | IIB | IIC | IID |
| Dibutyltin dilaurate, percent on solids | 0 | 0.1 | 0 | 0 |
| Dibutyltin bis(lauryl) mercaptide percent on solids | 0 | 0 | .02 | .02 |
| Trimethylpiperazine, percent on solids | 0 | 0 | .2 | .21 |
| Boron trifluoride etherate, percent on solids | 0 | 0 | 0 | .02 |

The resulting compositions were then tested for physical properties, the results of which are set forth below in Table III.

TABLE III

|  | Composition | | | |
|---|---|---|---|---|
|  | IIA | IIB | IIC | IID |
| Tensile strength, p.s.i. | 5,100 | 3,640 | 4,520 | 3,800 |
| Yield tensile, p.s.i. | 4,220 | 4,100 | 3,960 | 3,900 |
| 100% modulus, p.s.i. | 3,200 | 3,230 | 3,280 | 3,120 |
| Elongation, percent | 235 | 144 | 179 | 165 |
| Elongation at yield, percent | 7 | 8 | 7 | 8 |
| Hardness, Sward | 36 | 36 | 38 | 32 |
| Split tear, p.s.i. | 15 | 18 | 15 | 20 |
| Taber abrasion W/Cs 17 wheel with 1,000 gms. lost/1,000 cycles | 40 | 39.3 | 34.4 | 41.8 |
| Set to touch time, hrs | 7 | 3 | 2 | 2 |
| Dust free time, hrs | 17 | 4 | 2 | 2 |
| Hard dry time, hrs | 24 | 11 | 4.5 | 6 |
| Gel time at 50° C., days | 65 | 27 | 12 | 90 |
| Room temperature viscosity, in cps., 1 yr | 132 | 132 | 330 | 232 | these compositions sufficient amounts of xylene were added thereto to provide a 50% solids composition. The propolymers employed herein, of which there were sixteen, were prepared from the following:

| Ingredient— | Amount, moles |
|---|---|
| Polyol 1 | 2 |
| Polyol 4 [1] | 2 |
| Toluene diisocyanate | 9.3 |

[1] Polyol 4—A polyoxypropylene glycol having an average molecular weight of about 1000.

The sixteen prepolymers then had added thereto either a tetravalent metallo-organic salt, a tertiary heterocyclic amine, a boron trifluoride compound or some, or all of these, as set forth below in Table IV. Thereafter, the physical properties of these compositions were then tested and these results are tabulated in Table V, below.

TABLE IV

| Ingredient | Composition | | | | | | | | | | | | | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 |
| Dibutyltin dilaurate, percent weight on solids | 0.02 | 0.02 | 0.02 | 0.02 | 0.02 | 0.02 | | | | | | | | | | |
| Dibutyltin bis(lauryl) mercaptide, percent weight on solids | | | | | | | 0.02 | 0.02 | 0.02 | 0.02 | 0.02 | 0.02 | | | | |
| Dibutyltin bis(isooctyl)thioglycolate, percent weight on solids | | | | | | | | | | | | | 0.02 | 0.02 | 0.02 | 0.02 | 0.02 |
| Trimethylpiperzaine, percent weight on solids | | | 0.2 | 0.2 | | | | 0.2 | 0.2 | | | | | 0.2 | 0.2 | |
| Triethylenediamine (DABCO), percent weight on solids | | | | | 0.2 | 0.2 | | | | 0.2 | 0.2 | | | | 0.2 | 0.2 |
| Boron trifluoride etherate, percent wieght on solids | | 0.02 | | 0.02 | | 0.02 | | 0.02 | | 0.02 | | 0.02 | | 0.02 | | 0.02 |

TABLE V

| Physical properties | Composition | | | | | | | |
|---|---|---|---|---|---|---|---|---|
|  | 1 | 2 | 3 | 4 | 5 | 6 | 7 | 8 |
| Gardner viscosity, initial | D | G | G | G | G | G | H | G–H. |
| Gardner viscosity at 50° C.[1] after period of time | G | M | Gelled 10 da. | K | Gelled 3 da. | Gelled 21 da. | Gelled 6 da. | Gelled 3 da. |
| Stability at 122° F | Gelled 162 da. | Gelled 29 da. | Gelled 10 da. | Gelled 59 da. | Gelled 3 da. | Gelled 21 da. | Gelled 6 da. | Gelled 3 da. |
| Viscosity after one year, in cps. at room temperature | 260 | 280 | Gelled 5 mo. | 928 | Gelled 1 mo. | Gelled 5 mo. | Gelled 5 mo. | Gelled 2.5 mo. |
| Sward hardness, 6 days | 22 | 20 | 18 | 22 | 22 | 18 | 16 | 20. |
| Sward hardness, final | 22 | 20 | 20 | 22 | 22 | 20 | 20 | 22. |
| Set to touch time, hrs | 4 | 1.5 | 1 | 1 | 0 | 0 | 2.5 | 1. |
| Dust free time, hrs | 10 | 3 | 2 | 2 | 1 | 1 | 4 | 2. |
| Hours to dry time | 23 | 7 | 3 | 4 | 2 | 2 | 8.5 | 5. |

| | Composition | | | | | | | |
|---|---|---|---|---|---|---|---|---|
|  | 9 | 10 | 11 | 12 | 13 | 14 | 15 | 16 |
| Gardner viscosity, initial | G | J | G | H | H | G | M | G. |
| Garnder viscosity at 50° C.[1] after period of time | R | Gelled 3 da. | Gelled 17 da. | Gelled 7 da. | Gelled 4 da. | N | Gelled 1 da. | Gelled 17 da. |
| Stability at 122° F | Gelled 430 da. | Gelled 3 da. | Gelled 17 da. | Gelled 7 da. | Gelled 4 da. | Gelled 45 da. | Gelled 1 da. | Gelled 17 da. |
| Viscosity after one year, in cps. at room temperature | Gelled 11 mo. | Gelled 1 mo. | Gelled 5 mo. | Gelled 10 mo. | Gelled 2.5 mo. | Gelled 11.5 mo. | Gelled 1 mo. | Gelled 5 mo. |
| Sward hardness, 6 days | 22 | 24 | 26 | 24 | (²) | (²) | (²) | (²). |
| Sward hardness, final | 22 | 24 | 26 | 24 | 26 | (²) | 26 | 24. |
| Set to touch time, hrs | 1 | 0 | 0 | 2 | 1 | 1 | 0 | 0. |
| Dust free time, hrs | 2 | 0.5 | 0.5 | 4 | 2 | 2 | 1 | 1. |
| Hours to dry time | 5 | 1 | 1.5 | 8 | 3.25 | 5 | 1.5 | 2. |

[1] Compounds 1–6 checked after 22 days; Compounds 7–11 checked after 21 days; Compounds 12–16 checked after 18 days.
[2] Tests not taken.

This data shows that when all three ingredients are added there is no deleterious effects on the physical properties of the urethane while providing excellent storage stability and quick cure times to the compositions.

EXAMPLE III

Another comparative series of compositions, similar to those of Example II were prepared by the procedure of Example I but without adding a catalyst to the prepolymer and wherein the boron trifluoride was added to the composition after the prepolymer was made. In all It can be seen from the above data that only those compounds prepared in accordance herewith, compositions 4, 6, 9, 11, 14 and 16, afforded both excellent shelf stability and quick curing times.

EXAMPLE IV

A series of four compositions were prepared herein by the procedure of Example I, but wherein both a tetravalent metallo-organic catalyst and boron trifluoride etherate were incorporated into the prepolymer formation. Thereafter, as in the previous examples varying amounts of the tetravalent metallo-organic salt, tertiary heterocyclic amine and some boron trifluoride etherate were added. Again, sufficient amounts of xylene were employed to prepare 50% solids composition. The prepolymers were prepared, as in Example I, from the following:

| Ingredient— | Amount |
|---|---|
| Polyol 3 _____moles__ | 3.00 |
| Polyol 2 _____do____ | 2.00 |
| Toluene diisocyanate _____do____ | 10.40 |
| Stannous octoate, percent on solids _____ | 0.01 |
| Boron trifluoride ethereate, percent on solids __ | 0.01 |

To these compounds, identified as IVA, IVB, IVC, IVD, respectively, were then added the various additives as shown below in Table VI.

TABLE VI

| Ingredient | Composition | | | |
|---|---|---|---|---|
| | IVA | IVB | IVC | IVD |
| Dibutyltin bis(isooctyl) thioglycolate, percent weight on solids | | 0.02 | 0.02 | 0.02 |
| Trimethylpiperazine, percent weight on solids | | | 0.02 | 0.02 |
| Boron trifluoride etherate, percent weight on solids | | | | 0.01 |

These four compositions were then tested for physical properties The results are set forth below in Table VII.

TABLE VII

| Physical properties | Composition | | | |
|---|---|---|---|---|
| | IVA | IVB | IVC | IVD |
| Tensile strength, p.s.i | 4,375 | 4,200 | 3,950 | 3,840 |
| Yield tensile, p.s.i | 6,450 | 5,760 | 5,050 | 5,275 |
| Elongation, percent | 76 | 19 | 15 | 31 |
| Elongation at yield, percent | 8.6 | 8.6 | 7.5 | 8.0 |
| Sward hardness | 36 | 36 | 38 | 32 |
| Split tear, p.s.i | 25 | 16 | 20 | 22 |
| Set to touch time, hrs | 5 | 2.5 | 1.5 | 1.5 |
| Dust free time, hrs | 12.5 | 6.5 | 3 | 3.5 |
| Hard dry time, hrs | 23.5 | 10 | 6 | 7.0 |
| Taber abrasion W/Cs 17 wheels with 1,000 gms., mg. lost/1,000 cycles | 44.3 | 41.4 | 47.4 | 43.7 |
| Stability at 122° F | (1) | (2) | (3) | (3) |
| Viscosity, in cps., after one year | 190 | 208 | 652 | 600 |
| Gardner viscosity, initial | E | E | E | E |
| Gardner viscosity, 8 days at 122° F | E | F | H | H |

1 Gelled, 202 days.
2 Gelled, 120 days.
3 Gelled, 28 days.

Again the data shows that there are no deleterious effects to the physical properties of the coating compositions when the salt, amine and boron trifluoride compounds are added to the composition. Moreover, only when these ingredients are present concurrently is there provided a coating composition having excellent stability and rapid cure.

What is claimed is:
1. A single package, moisture curable, stabilized, urethane coating composition consisting essentially of:
   (a) an isocyanate-terminated prepolymer in an inert solvent, said solution having from about 30 to 70 percent by weight of solids;
   (b) a boron trifluoride compound in an amount from about 0.002 to about 0.2 percent by weight based on the weight of said prepolymer;
   (c) an amine selected from the group consisting of triethylene diamine, piperazine, trimethyl piperazine and 4,4'-methylene bis (2-chloroaniline) and in an amount from about 0.02 to about 1.0 percent by weight based on the weight of said prepolymer; and
   (d) a tetravalent metallo-organic salt selected from the group consisting of dibutyltin dilaurate, dibutyltin bis(lauryl) mercaptide, and dibutyltin bis(isooctyl) thioglycolate and in an amount from about 0.01 to about 0.2 percent by weight based on the weight of said prepolymer.
2. A composition as defined in claim 1 wherein the amine is selected from the group consisting of trimethylpiperazine, triethylene diamine.
3. A composition as defined in claim 1 wherein the isocyanate-terminated prepolymer is the reaction product of an organic polyisocyanate and an organic polyol.
4. A composition as defined in claim 3 wherein the organic polyol is a polyalkylene ether polyol.
5. A composition as defined in claim 1 wherein the boron trifluoride compound is boron trifluoride etherate.

References Cited

UNITED STATES PATENTS 3,013,906  12/1961  Flowers _____ 117—232

OTHER REFERENCES

Saunders et al.: Polyurethanes, part II, Interscience, New York, 1964, pp. 477–485.

DONALD E. CZAJA, Primary Examiner

M. J. WELSH, Assistant Examiner

U.S. Cl. X.R.

117—142, 148; 260—75 NC